(12) United States Patent  (10) Patent No.: US 7,714,766 B2
Costes et al.  (45) Date of Patent: May 11, 2010

(54) METHOD OF PROCESSING A RADAR IMAGE

(75) Inventors: Clementine Costes, Brest (FR); Jean-Paul Artis, Plouzane (FR); Henri Sauvageot, La Barthe-Inard (FR)

(73) Assignee: Thales, Neuilly sur Seine (FR)

( * ) Notice: Subject to any disclaimer, the term of this patent is extended or adjusted under 35 U.S.C. 154(b) by 35 days.

(21) Appl. No.: 12/341,271

(22) Filed: Dec. 22, 2008

(65) Prior Publication Data

US 2009/0167596 A1 Jul. 2, 2009

(30) Foreign Application Priority Data

Dec. 21, 2007 (FR) ................... 07 09028

(51) Int. Cl.
*G01S 13/95* (2006.01)
(52) U.S. Cl. ............... 342/26 R; 342/26 B; 342/159; 342/195
(58) Field of Classification Search .......... 342/26 R, 342/26 A–26 D, 159, 162, 195
See application file for complete search history.

(56) References Cited

U.S. PATENT DOCUMENTS

| 3,885,237 | A |   | 5/1975  | Kirkpatrick |        |
|-----------|---|---|---------|-------------|--------|
| 5,805,106 | A | * | 9/1998  | Baum        | 342/159 |
| 5,973,635 | A |   | 10/1999 | Albo        |        |
| 6,046,695 | A | * | 4/2000  | Poehler et al. | 342/25 A |
| 6,061,013 | A | * | 5/2000  | Sauvageot et al. | 342/26 R |
| 6,081,220 | A | * | 6/2000  | Fujisaka et al. | 342/26 D |
| 6,340,946 | B1| * | 1/2002  | Wolfson et al. | 342/26 R |
| 6,549,161 | B1|   | 4/2003  | Woodell     |        |
| 6,882,302 | B1|   | 4/2005  | Woodell et al. |        |
| 7,205,928 | B1|   | 4/2007  | Sweet       |        |

(Continued)

FOREIGN PATENT DOCUMENTS

WO WO 9724629 A1 * 7/1997

OTHER PUBLICATIONS

Galati, et al."Reconstruction of the spatial distrubution of radar reflectivity of precipitation through linear-inversion techniques", vol. 143, No. 6, Dec. 3, 1996 pp. 375-382.

(Continued)

*Primary Examiner*—John B Sotomayor
(74) *Attorney, Agent, or Firm*—Darby & Darby

(57) ABSTRACT

Embodiments of the invention process a radar image arising from a radar antenna, by reading the reflectivity information associated with each pixel forming the radar image, processing the reflectivity information, pixel by pixel, with the aid of a first procedure. The method further includes a second processing of the radar image using a second procedure that includes extracting objects from the radar image, then calculating the extent and the position of each object, with the aid of an angular aperture between two signals. For each part of the radar image processed by the first procedure, corresponding to an extracted object, pixel within the result of the first procedure are replaced by corresponding pixels of the radar image processed by the second procedure, if the reflectivity value associated with the second pixel is greater than the reflectivity value of the first pixel, the parts of the radar image corresponding to zones situated at a distance greater than a given threshold from the radar antenna.

13 Claims, 6 Drawing Sheets
(1 of 6 Drawing Sheet(s) Filed in Color)

U.S. PATENT DOCUMENTS

| | | | |
|---|---|---|---|
| 7,307,577 B1* | 12/2007 | Kronfeld et al. | 342/26 B |
| 7,427,943 B1* | 9/2008 | Kronfeld et al. | 342/26 B |
| 7,486,220 B1* | 2/2009 | Kronfeld et al. | 342/26 B |
| 2008/0224923 A1* | 9/2008 | Aprile | 342/25 D |
| 2008/0309549 A1* | 12/2008 | Chabah et al. | 342/26 B |

OTHER PUBLICATIONS

Granier, "Restoration of images perturbed by atmospheric turbulence" (Notes: 142), 116 ref), (submitted in 1996), (No. 96 PA 11 2496).

* cited by examiner

METHOD OF PROCESSING A RADAR IMAGE

This application claims the benefit of French Application No. 07 09028, filed Dec. 21, 2007, the entire disclosure of which is incorporated by reference in its entirety.

TECHNICAL FIELD

The invention pertains to the processing of a radar image, in particular the processing of the reflectivity values of the pixels forming the radar image. It is particularly suited to airborne radars, and in particular to meteorological radars.

BACKGROUND OF THE INVENTION

A meteorological radar makes it possible to locate precipitations such as rain, snow or hail, to measure their intensity and possibly to chart dangerous phenomena. Most meteorological radars are installed on the ground and often form part of a vaster meteorological monitoring network.

Nevertheless, ever more airborne applications are emerging, in order to make it possible to sidestep cumulonimbus formations. These enormous clouds are much feared by pilots as they sometimes produce violent storms. Specifically, lightning, hail, and strong wind shears inside the cloud are added to the risk of icing and may endanger the flight if the pilot tries to pass through.

A meteorological radar allows the detection of extended voluminal targets (objects) constituted by clouds, of which it must give the position, size and dangerousness. For this purpose, a meteorological radar can for example emit a wave in the X-band with the aid of its antenna. The distance to a cloud is deduced from the time necessary for the pulse emitted to perform the outward-return trip from the antenna of the radar to the cloud at the speed of light. This time corresponds simply to the duration between the emission of a pulse and the reception of its echo.

On the basis of the echoes received, radar images are formed. The pixels of each image are associated with reflectivity values corresponding to their amplitude. It is recalled that for a given point of the zone scanned by the radar, the reflectivity corresponds to the ratio of the energy reflected by this point to the total incident energy. The reflectivity value of each pixel is dependent on the intensity of the returned echo.

The size of a cloud is dependent on its surface area (the maximum horizontal distance over which it extends) and its elevation, (the maximum vertical distance over which it extends). The elevation defines first and foremost the dangerousness of the cloud: the higher a convective cloud, the more dangerous it is. But the dangerousness level of the cloud is also related to its reflectivity factor, denoted Z, which characterizes the concentration of hydrometeors in suspension in a volume of air, in liquid or solid form. Stated otherwise, the reflectivity factor Z represents the intensity of the cloud. On a logarithmic scale, it is measured in dBZ.

Specifically, a simplified representation of the clouds is displayed to the pilot by a viewing console, with the aid of a colour code characterizing the reflectivity, whether involving rain, snow or hail. For example, the colour black is often used for dry air, that is to say the absence of cloud. Green and yellow can be used for medium humidity concentrations. Red is often used for zones with very high humidity concentration, that is to say the most dangerous zones that absolutely must be sidestepped.

Currently, to determine the number of clouds, their position or else their intensity, the radar image is processed in one go, for example with the aid of a pixel-by-pixel processing procedure. By this processing, the reflectivity values associated with the pixels of the image are corrected, so as to approach as closely as possible to the real situation, that is to say the situation of the zone aimed at by the beam emitted by the radar antenna.

The quality of the result of this processing varies as a function of the separation distance between the zone and the radar antenna. Though it is relatively good at short distance, it becomes difficult to utilize at medium and long distance, especially if the resolution of the radar is low, this often being the case for airborne radars. In the case of meteorological radars, various phenomena will disturb the quality of the results.

For example, it then becomes particularly difficult to distinguish the ground clutter (spurious noise) from the useful signal, when the beam of the radar encompasses both the ground and the aerial domain.

Furthermore, the atmospheric attenuation makes it tricky to estimate the reflectivity levels.

All these constraints limit the maximum display distance to some hundred nautical miles, which in many situations is not sufficient.

SUMMARY OF THE INVENTION

The invention is aimed notably at affording a solution to these problems.

An aim of the invention is to propose a method of processing the image making it possible to distinguish a cloud and to evaluate its dangerousness independently of the distance of the cloud from the radar antenna.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION

Figure 1:
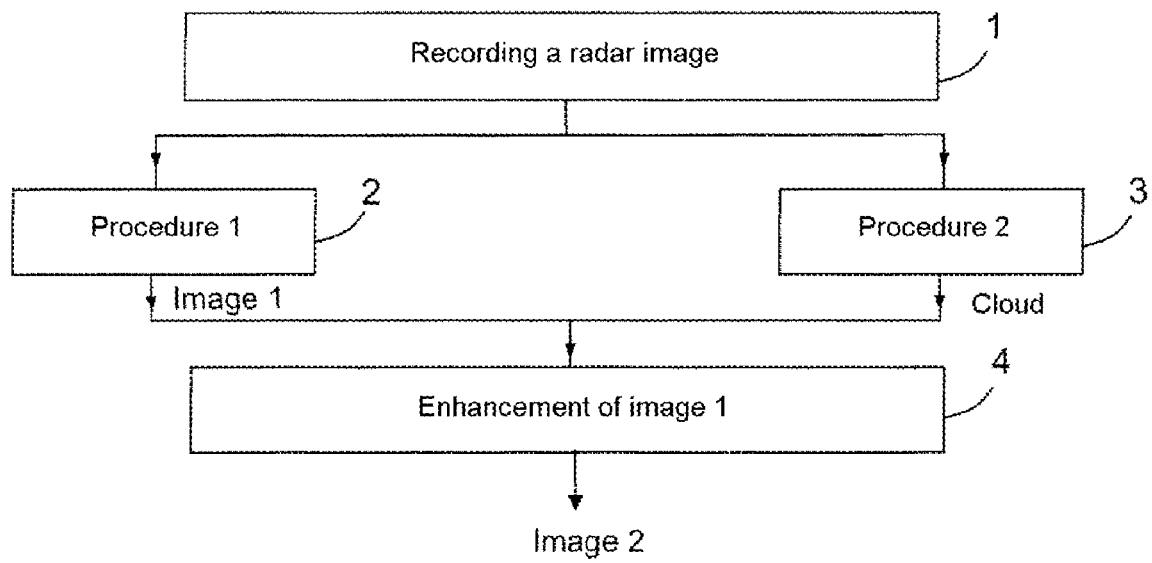
FIG. 1 illustrates a method in accord with an embodiment of the invention.

For this purpose, there is proposed a method of processing a radar image arising from a radar antenna, comprising reading the reflectivity information associated with each pixel forming the radar image, a first processing of the reflectivity information, pixel by pixel, with the aid of a first procedure.

According to a general characteristic of this aspect, the said method furthermore comprises:

- a second processing of the radar image with the aid of a second procedure comprising extracting objects from the radar image, then calculating the extent and the position of each object, with the aid of an angular aperture between two signals, and
- for each part of the radar image processed by the first procedure, corresponding to an extracted object, replacing the pixel of the zone considered, termed the first pixel, with the corresponding pixel of the radar image processed by the second procedure, termed the second pixel, if the reflectivity value associated with the second pixel is greater than the reflectivity value of the first pixel, the said parts corresponding to zones situated at a distance greater than a given threshold from the radar antenna.

Stated otherwise, for the part of the image corresponding to a zone that is relatively distantly separated from the radar antenna, the pixels forming clouds are substituted with pixels arising from clouds extracted from the radar image with the aid of another processing.

Embodiments of the invention have the advantage of producing a radar image having a very good representation of the clouds surrounding the radar, whatever their separation. Specifically, the first procedure makes it possible to detect clouds at short distance, while the second procedure makes it possible to give a good evaluation of the clouds situated at medium and long distance.

The enhancement of the image processed by the first procedure with the aid of pixels originating from the second procedure allows the realization of an optimal radar image, as regards the identification of the clouds.

For example, the said threshold can be equal to 80 NM.

Preferably, the position of an object is given by the position of its summit.

For example, the first procedure can comprise removing the ground clutter and, for each pixel of the image, minimizing the square error between the reflectivity value of the pixel considered and a reflectivity value estimated on the basis of the pattern of the radar antenna and of the reflectivity values of the pixels surrounding the pixel considered.

The second procedure preferably comprises determining the said angular aperture corresponding to the extent in a plane of the extracted object, the object being situated at a given distance from the radar antenna. The said determining comprises:

a step of measuring echoes in directions $$\theta_p - \frac{\Delta\theta}{2} \text{ and } \theta_p + \frac{\Delta\theta}{2}$$

of the plane, where $\theta_p$ is a variable angle corresponding to directions of the plane and $\Delta\theta$ is a given angular aperture;

a step of calculating the pairwise differences between the echo measurements taken in the directions $$\theta_p - \frac{\Delta\theta}{2} \text{ and } \theta_p + \frac{\Delta\theta}{2};$$

a step of determining the slope at a value $\theta_p$ of a function e of $\theta_p$ interpolated between the calculated differences, the angular aperture which corresponds to the extent of the object at the given distance being deduced from the slope.

This procedure is particularly suited to the determination of the extent of a cloud situated a long distance from the radar antenna.

Preferably, the slope of the function e is determined at the value of $\theta_p$ for which the function e substantially vanishes.

The angular aperture which corresponds to the extent of the object at the given distance can be extracted from a correspondence base associating angular aperture values with slope values, the slope of the function e at the value of $\theta_p$ for which the function e vanishes having previously been calculated on the basis of measurements performed on a synthetic object of variable angular aperture.

The plane can be the vertical plane.

As a variant, the plane can be the horizontal plane.

For example, the radar can be a meteorological radar, the angular aperture corresponding to the height of a cloud.

According to a mode of implementation, the value of $\theta_p$ for which the function e vanishes is assumed to point to the centre of the cloud, the altitude of the centre of the cloud being calculated by trigonometry, using the given distance between the radar antenna and the cloud.

The altitude of the summit of the cloud can be calculated by adding half the height of the cloud to the altitude of the centre of the cloud.

The meteorological radar can be airborne.

Reference is made to FIG. 1 which illustrates a mode of implementation according to the invention. First of all in the course of a first step 1, a radar image is recorded. This image undergoes a first processing with the aid of a first procedure, procedure 1, so as to adjust the reflectivity values of the image, step 2. This processing is performed with the aid of a conventional procedure, an example of which will be given hereinafter. The processed image is referenced image 1.

In parallel, the radar image is processed with the aid of a procedure, procedure 2, which is capable of extracting the clouds from the radar image, step 3. This procedure 2 is based on iterative deviometry, which will be detailed hereinafter. On completion of this second processing, the various clouds extracted from the image are obtained, that is to say their position and the reflectivity values of the pixels of which they are constituted.

Preferably, each procedure is applied to the vertical sections of the image with constant azimuth, called RHI sections by the person skilled in the art for "Range Height Indicator".

Finally, a last step, step 4, comprises an enhancement of the image, image 1, with the aid of the clouds extracted by the second processing. For the part of the image situated at a certain distance from the radar antenna, the pixels of the zones of the image 1 corresponding to the positions of the clouds are replaced with the pixels of the clouds extracted by the second procedure. The replacement of one pixel by another is performed if the reflectivity value of the pixel belonging to the cloud extracted is greater than the reflectivity value of the corresponding pixel of the image, image 1.

For example, the replacement is performed for the parts of the image corresponding to zones further than 80 NM away from the antenna.

Figure 2:
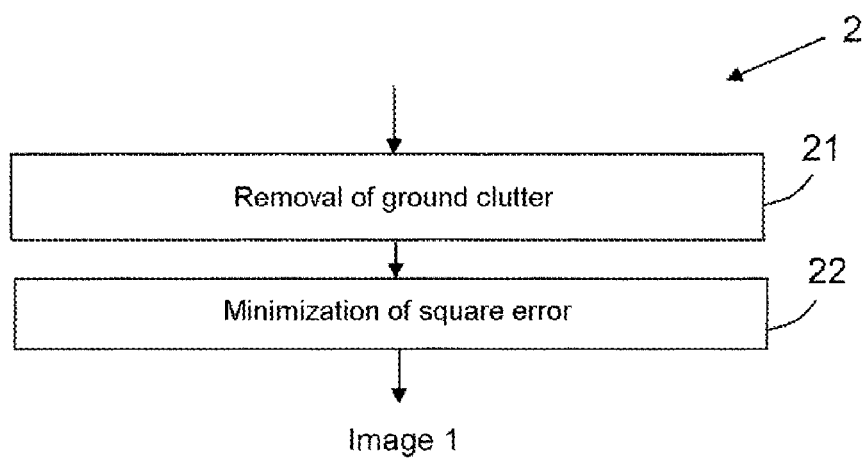
FIG. 2 illustrates substeps of a method of the first processing procedure of the radar image, in accord with an embodiment of the invention.

FIG. 2 more particularly illustrates a mode of implementation of the first processing of the radar image.

First of all, the ground clutter, that is to say the spurious signals situated at the lower limit of the image, is removed, step 21. Once the clutter has been removed, a pixel-by-pixel estimation procedure is applied here, for example the least squares procedure, step 22, such as that described in the thesis by Bernard Granier: "Restauration d'images perturbées par la turbulence atmosphérique" [Restoration of images perturbed by atmospheric turbulence], [Note(s): 142], (116 ref.), (Submitted in 1996), (No: 96 PA11 2496).

This procedure consists in minimizing the mean square error E between the value of the reflectivity of the pixel $R(\rho, \theta, \phi, t)$, and an estimated value of the reflectivity of the pixel considered $\hat{R}(\rho,\theta,\phi,t)$, with $E=\|R(\rho,\theta,\phi,t)-\hat{R}(\rho,\theta,\phi,t)\|$. The parameters $\rho$, $\theta$ and $\phi$ correspond to the polar coordinates of the pixel considered at the instant t.

The estimated value of the reflectivity $\hat{R}(\rho,\theta,\phi,t)$ depends on the radiation pattern of the radar antenna, and the reflectivity value of the neighbour pixels of the pixel considered.

Figure 3:
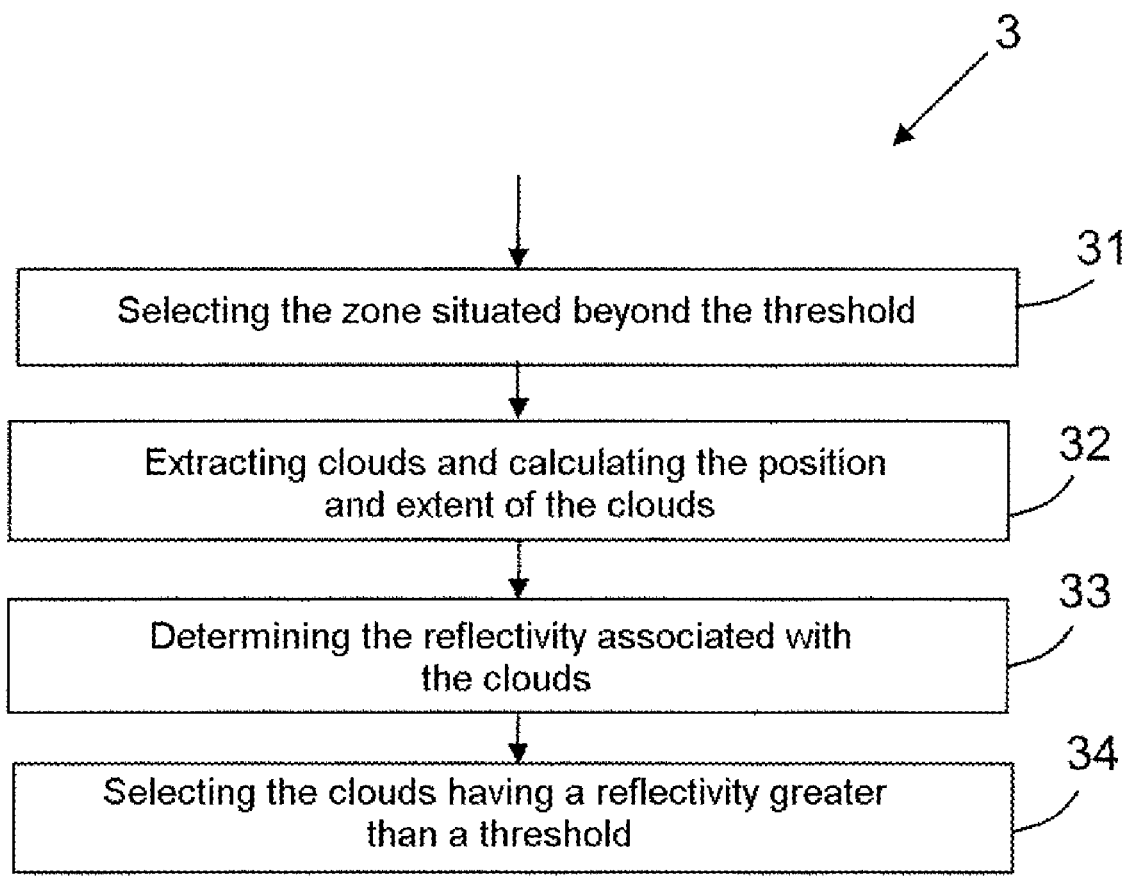
FIG. 3 illustrates substeps of a method of the second processing procedure of the radar image, in accord with an embodiment of the invention.

FIG. 3 describes a mode of implementation of the second processing procedure, procedure 2. The latter comprises a first step 31, which comprises a selection of the part of the image corresponding to a zone situated beyond a distance threshold. This distance threshold can be equal to 80 NM. Of course, this value can be adapted by the person skilled in the art, for example as a function of the characteristics (resolution, application, etc.) of the radar used. It is estimated here that the image processed with the aid of the first procedure 1, does not give sufficiently reliable results for the zones situated beyond this distance threshold.

On the part of the image selected, the clouds present are extracted and then the position and the extent of the image are calculated, step 32. In this example, the information regarding the position and extent of a cloud is synthesized into the information regarding the position of the summit of this cloud.

Then, the reflectivity value of the pixels forming the extracted clouds is evaluated, step 33. The clouds whose reflectivity value is greater than a reflectivity threshold, in this example 40 dBZ, are then selected.

Figure 4:
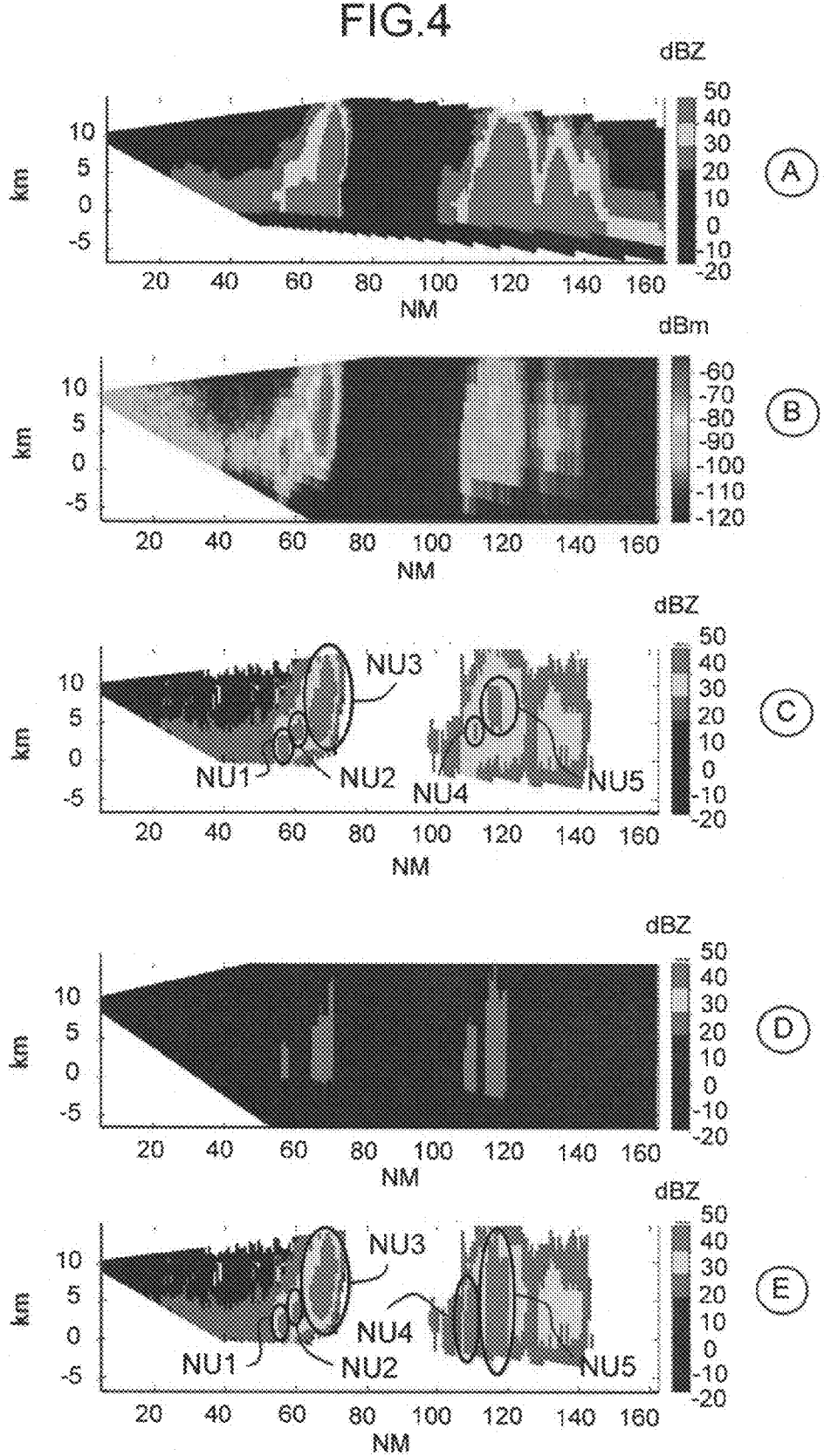
FIG. 4 illustrates a vertical section through an exemplary radar image, in accord with an embodiment of the invention.

FIG. 4 represents the various radar images (more precisely a vertical section through this radar image).

View A represents the weather situation for a zone situated between 20 NM and 160 NM.

View B illustrates for its part the radar image formed on the basis of the echoes received by the airborne radar antenna. As may be seen, this image is difficult for a pilot to utilize.

View C illustrates the radar image, image 1, on completion of the first processing with the aid of the first procedure, procedure 1. Five zones at risk, referenced NU1, NU2, NU3, NU4 and NU5, are visible.

View D represents the clouds extracted with the aid of the second processing applied to the radar image, with the aid of the second procedure, procedure 2. In this example, in order to facilitate the implementation of the method, once the summit line of the cloud has been determined, the extent of the cloud is prolonged to the ground, or at least to the spot where the ground clutter starts.

Finally, view E represents the image, image 1, enhanced with the pixels of the clouds extracted during the second processing. The extent of the clouds NU4 and NU5 has greatly increased after the enhancement of the image.

Figure 5:
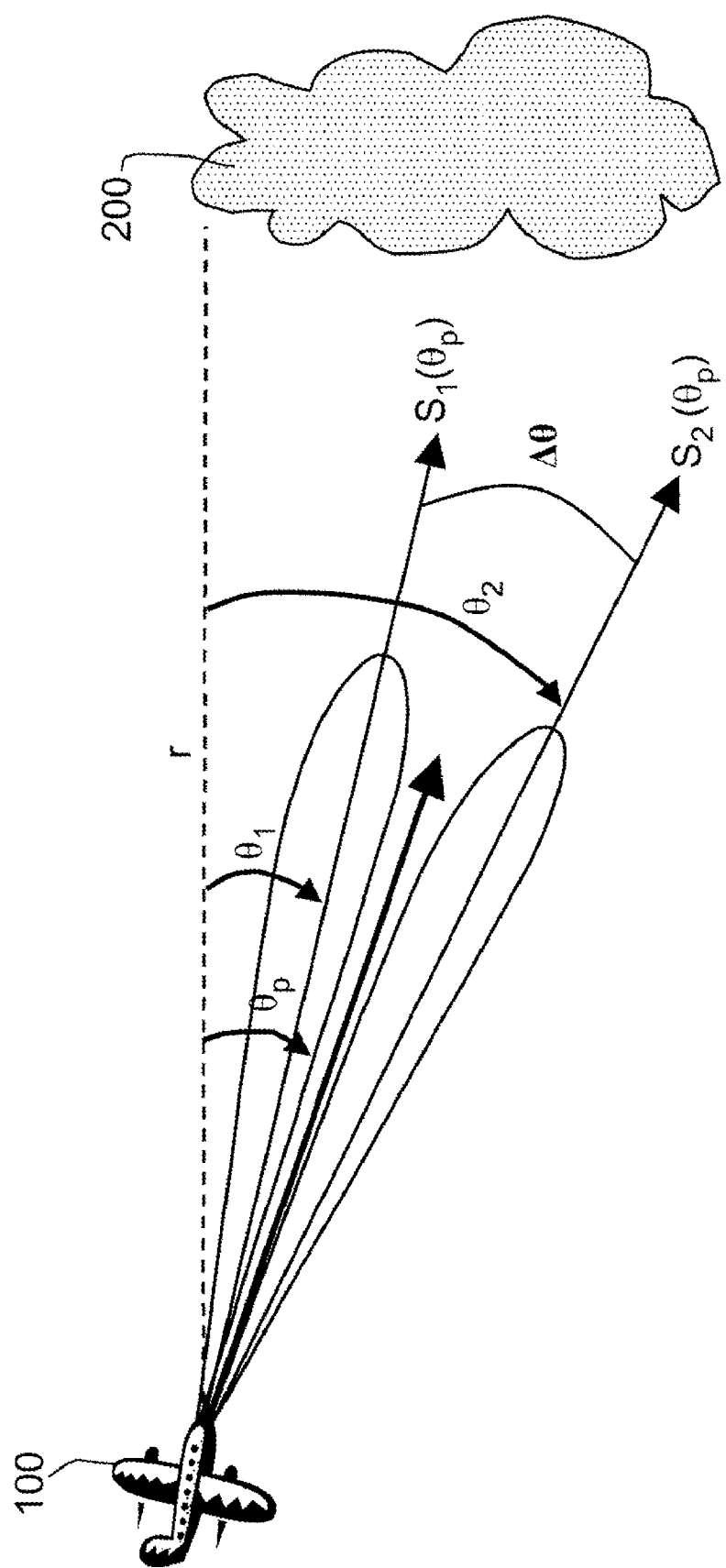
FIG. 5 illustrates an exemplary schematic implementation of the second processing procedure of the radar image, in accord with an embodiment of the invention.
Figure 6:
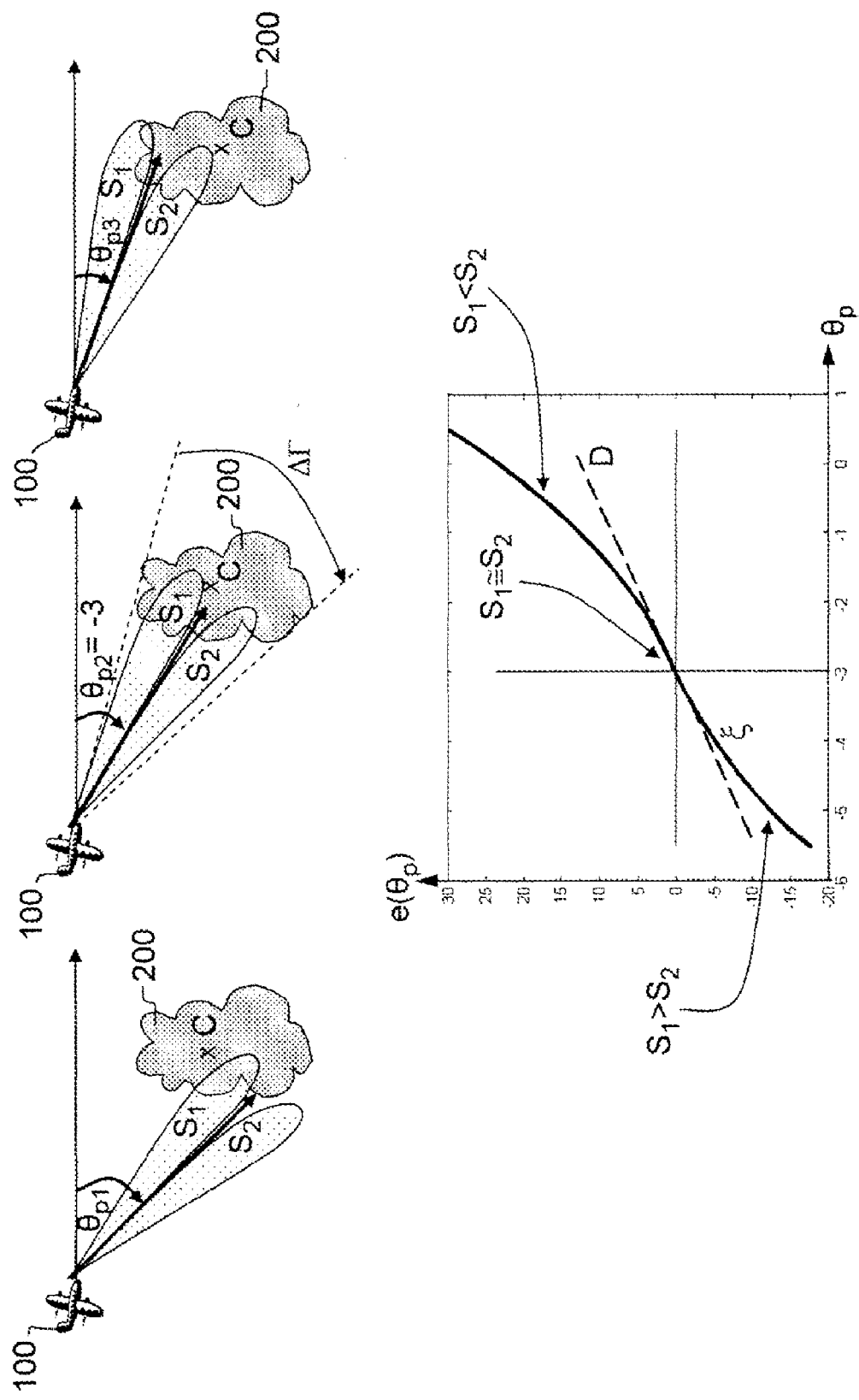
FIG. 6 illustrates the shape of a deviometry curve when the deviometry procedure is applied to an extended target.
Figure 7:
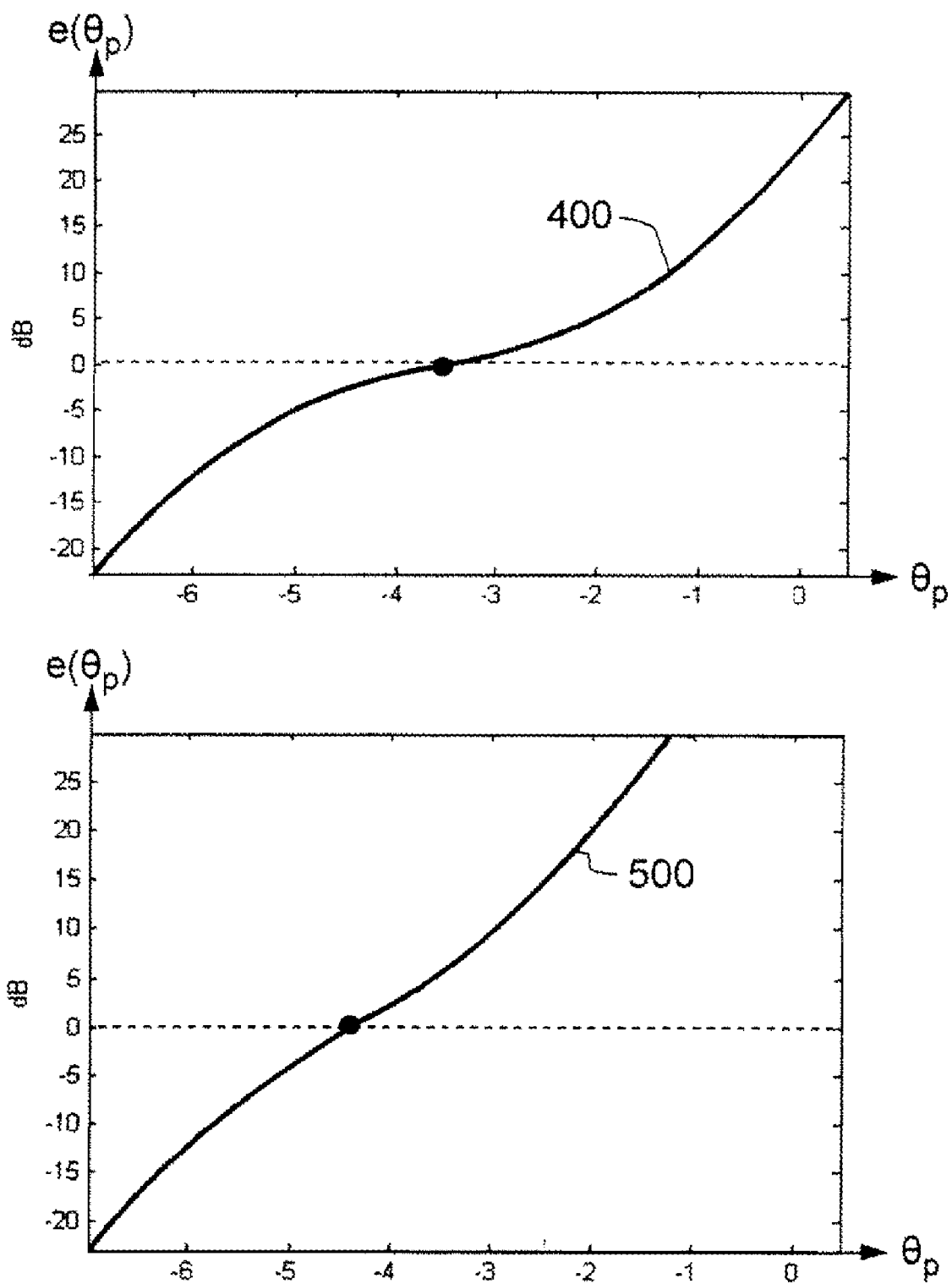
FIG. 7 illustrates two deviometry curves corresponding to two clouds of different sizes.

Reference is now made to FIGS. 5 to 7 which more precisely describe a mode of implementation of the procedure referenced procedure 2, allowing notably the extraction of the clouds from a radar image, and the calculation of their extent and their position. The latter is a deviometry procedure based on determining an angular aperture, but which unlike a conventional deviometry procedure makes it possible to measure the extent of the clouds, and not simply their position.

For an arbitrary target, the procedure referenced procedure 2, makes it possible on the one hand to determine the position of the target (here a cloud), characterized by a centre which is itself charted by a pointing angle $\theta_{centre}$, and on the other hand makes it possible to determine the extent of the target, characterized by an angular aperture $\Delta\theta$. The pointing angle $\theta_{summit}$ corresponding to the position of the summit of the target is easily deduced from the equality (1):

$$\theta_{summit} = \theta_{centre} + \frac{\Delta\theta}{2} \qquad (1)$$

The knowledge of $\theta_{summit}$ is particularly relevant in the case of a meteorological radar where the target is a cloud, since the altitude of the summit of the cloud and its evolution over time are characteristic of the dangerousness of the phenomenon. Moreover, this procedure makes it possible to obtain the value $\theta_{summit}$ with high precision, even at large distance, just where with other procedures the thermal noise would generate very troublesome ambiguities. Additionally, the procedure referenced procedure 2 makes it possible to immediately identify targets charted by their position characterized by $\Delta_{centre}$, their size characterized by $\Delta\theta$ and possibly their intensity. The stored data are therefore of small size in comparison to a pixel-by-pixel processing procedure, this constituting a definite advantage within the framework of embedded use.

FIG. 5 illustrates by a schematic an exemplary implementation of the procedure, termed procedure 2, applied to an embedded meteorological radar on board an aircraft 100.

For a given angle $\Delta\theta$ and for values of an elevational scan angle $\theta_p$, at least two pulses are emitted in directions $\theta_1$ and $\theta_2$ defined by $$\theta_1(\theta_p) = \theta_p - \frac{\Delta\theta}{2} \text{ and } \theta_2(\theta_p) = \theta_p + \frac{\Delta\theta}{2}.$$

For example, if the elevational range of the antenna is about 10 degrees, it can be scanned as 15 beams corresponding to 15 distinct values of $\theta_p$ spaced apart by about 0.7 degrees. The angle $\Delta\theta$ can be chosen in such a way that the main lobes corresponding to the two emitted beams are adjacent but do not overlap. Thus, if the antenna aperture is 3 degrees, $\Delta\theta$ can be of the order of 3 degrees. Echoes $S_1(\theta_p)$ and $S_2(\theta_p)$ originating from the two pulses reflected by a cloud 200 at a distance r from the aircraft 100 are measured. The deviation between the two echoes, that is to say the value $e(\theta_p)=S_2(\theta_p)-S_1(\theta_p)$, is calculated and stored. On completion of this process, when $\theta_p$ has scanned the whole of the elevational range of the radar, a value $e(\theta_p)$ corresponds to each of the values of $\theta_p$ that served for measuring values $S_1(\theta_p)$ and $S_2(\theta_p)$. This makes it possible to plot a so-called deviometry curve, that is to say to represent $e(\theta_p)$ graphically as a function of $\theta_p$ as represented in FIG. 6.

FIG. 6 illustrates in a graph a curve $\xi$ representing the evolution of the deviometry of the example according to the embodiment of FIG. 5. More generally, it also illustrates the shape of a deviometry curve when the deviometry procedure is applied to an extended target.

The curve ξ illustrates the variation of $e(\theta_p)$ for $\theta_p$ varying between −5.5 degrees and +0.5 degrees, this span corresponding to an elevational scan from bottom to top. The curve ξ has been obtained by interpolation between the values of $e(\theta_p)$ calculated on the basis of effective measurements $S_1(\theta_p)$ and $S_2(\theta_p)$, numerous interpolation procedures being known in addition. The curve ξ shows that the deviometry passes from negative values to positive values. Therefore the deviometry vanishes, possibly for a value of $\theta_p$ that has not served for performing an effective measurement of values $S_1(\theta_p)$ and $S_2(\theta_p)$.

From left to right at the top of FIG. 6, three schematics illustrate respectively the first case where $e(\theta_p)$ is negative which corresponds to the case where $S_1 > S_2$, the second case where $e(\theta_p)$ is substantially zero which corresponds to the case where $S_1 \approx S_2$ and finally the third case where $e(\theta_p)$ is positive which corresponds to the case where $S_1 < S_2$. Were one dealing with a conventional pointlike target and not the cloud 200, the conventional deviometry procedure would teach us only that the position of this target would be determined by the angle $\theta_p$ where the deviometry vanishes.

The interpretation according to an embodiment of the present invention is based on the assumption that the cloud 200, observed in a vertical plane by varying the angle of elevation of the antenna, advantageously exhibits a unique point C characterized by a maximum reflectivity factor, the reflectivity of the cloud 200 decreasing on moving away from the point C. Specifically, a cloud exhibits particular properties of homogeneity in the vertical direction.

It is also possible to use the deviometry in the horizontal plane, for clouds, even if the information regarding extent is trickier to interpret.

But embodiments of the present invention can nevertheless be applied to horizontally extended objects, for targets other than clouds. As illustrated by FIG. 6, embodiments of the present invention advantageously propose to geometrically centre the cloud 200 by assumption on the point C. This is why the point C will subsequently be called the centre of the cloud 200.

In the first case, $\theta_p = \theta_{p1}$ corresponds to an angle of elevation which intersects the cloud 200 below its centre C. Therefore, $S_1$ is reflected nearer the centre C of the cloud 200 than is $S_2$, therefore the intensity of $S_1$ is greater than that of $S_2$. In the second case, $\theta_p = \theta_{p2}$ corresponds to an angle of elevation which intersects the cloud 200 substantially at its centre C. Therefore, $S_1$ is reflected substantially as near the centre C of the cloud 200 as is $S_2$, therefore the intensity of $S_1$ is substantially identical to that of $S_2$. In the third case, $\theta_p = \theta_{p3}$ corresponds to an angle of elevation which intersects the cloud 200 above its centre C. Therefore, $S_1$ is reflected further from the centre C of the cloud 200 than is $S_2$, therefore the intensity of $S_1$ is not as great. Embodiments of the present invention therefore provides an entirely innovative way of utilizing the principle of the deviometry procedure to determine the position of the centre of a cloud. Thus, from the pointing angle $\theta_{p2}$ equal to −3 degrees for which the deviometry in the example of FIG. 6 vanishes is deduced in an elementary way an altitude h of the centre C by virtue of the distance r which is known. The altitude h is not represented in FIG. 6 for clarity reasons. As illustrated by FIG. 7, embodiments of the present invention also proposes to use the slope of a straight line D corresponding to the slope at $\theta_{p2}$ of the deviometry curve, which slope will be denoted $P_e(0)$ subsequently, to estimate the size of the cloud 200.

FIG. 7 illustrates with the aid of two graphs deviometry curves 400 and 500 corresponding to two clouds of different sizes, curve 400 corresponding to a cloud of markedly greater size than the size of the cloud corresponding to curve 500. The difference between two pointings such as performed in embodiments of the invention varies greatly with the pointing angle when a heterogeneous zone is scanned, such as for example a dry air/humid air transition; this is what occurs when a small cloud is observed, which corresponds to two successive and close transitions, dry air/humid air followed by humid air/dry air. On the other hand, when a relatively homogeneous zone is scanned, such as the interior of a large cloud, the difference between the two pointings is small and varies little. Therefore the larger the cloud, the more slowly the deviometry varies and therefore the smaller the slope at the value for which it vanishes. Conversely, the smaller the cloud, the more rapidly the deviometry varies and therefore the larger the slope at the value for which it vanishes.

For example, a correspondence table containing slope values calculated on the basis of measurements taken on theoretical targets of known sizes at a known distance can be used. In such a table, an angular aperture corresponds to a slope value. This table can even optionally form the subject of an interpolation so as to obtain a continuous correspondence function giving an angular aperture whatever slope is calculated. Thus, in the example of FIG. 6 a table or a function can match an angular aperture ΔΓ with the corresponding slope $P_e(0)$.

It is immediately deduced that at the distance r the angular aperture ΔΓ corresponds to a height H of the cloud 200. The height H is not represented in the figures for clarity reasons. Also, having made the assumption that C is the centre of the cloud 200, it can be deduced immediately that the floor of the cloud 200 is situated at an altitude $$h - \frac{H}{2}$$

and that its summit is situated at an altitude $$h + \frac{H}{2}.$$

Tests performed by the Applicant have thus made it possible to locate the altitude of the summit of a cloud zone of reflectivity equal to 40 dBz with a precision of the order of 500 meters at 160 nautical miles. This corresponds to an angular precision of the order of 0.1 degrees, which should not fail to be compared with the 3 degrees antenna aperture.

The procedure, termed procedure 2 described above therefore makes it possible to pinpoint the summit of the clouds with remarkable precision, thereby making it a procedure suited to airborne meteorological radars. Very robust to thermal noise, it is entirely indicated for numerous long-range applications.

The invention claimed is:
1. Method of processing a radar image from a radar antenna, the radar image comprising a plurality of pixels having an associated reflectivity value, the method comprising the steps of:
pre-processing the radar image by a first predetermined procedure, to produce a first pre-processed image comprising a plurality of first pixels;

pre-processing the radar image by a second predetermined procedure, to produce a second pre-processed image comprising a plurality of second pixels, the second predetermined procedure comprising the steps of:
    extracting an object from the radar image, to produce an extracted object;
    calculating an extent and a position of the extracted object by use of an angular aperture between two predetermined signals; and
    determining an associated reflectivity value for the second pixels of the extracted object;
for each extracted object, replacing each of the plurality of the first pixels of the first pre-processed image with the corresponding second pixel of the second pre-processed image, if the reflectivity value associated with the second pixel is greater than the reflectivity value of the first pixel,
wherein the replaced pixels correspond to zones situated at a distance greater than a predetermined threshold from the radar antenna.

2. The method according to claim 1, wherein the predetermined threshold is equal to 80 nautical miles.

3. The method according to claim 1, wherein the position of an object is given by a position of its summit.

4. The method according to claim 1, wherein the first predetermined procedure comprises the steps of:
    removing ground clutter; and
    minimizing, for each pixel of the image, a square error between a reflectivity value of the pixel and a reflectivity value estimated on the basis of a pattern of the radar antenna and of reflectivity values of pixels surrounding the pixel.

5. The method according to claim 1, wherein the second predetermined procedure determines the angular aperture corresponding to an extent in a plane of the extracted object, the extracted object being situated at a predetermined distance from the radar antenna, by performing the steps of:
    measuring echoes in directions $$\theta_p - \frac{\Delta\theta}{2} \text{ and } \theta_p + \frac{\Delta\theta}{2}$$

of the plane, where $\theta_p$ is a variable angle corresponding to directions of the plane and $\Delta\theta$ is a predetermined angular aperture;
calculating pairwise differences between the echo measurements taken in the directions $$\theta_p - \frac{\Delta\theta}{2} \text{ and } \theta_p + \frac{\Delta\theta}{2},$$

to produce calculated differences; and
determining a slope at a value $\theta_p$ of a function e of $\theta_p$ interpolated between the calculated differences,
wherein the angular aperture is calculated from the slope.

6. The method according to claim 5, wherein the slope of the function e is determined at the value of $\theta_p$ for which the function e substantially vanishes.

7. The method according to claim 5, wherein the angular aperture which corresponds to the extent of the object at the predetermined distance is extracted from a correspondence base associating angular aperture values with slope values, the slope of the function e at the value of $\theta_p$ for which the function e vanishes having previously been calculated on the basis of measurements performed on a synthetic object of variable angular aperture.

8. The method according to claim 6, in which the plane is the horizontal plane.

9. The method according to claim 6, in which the plane is the vertical plane.

10. The method according to claim 1, wherein the radar is a meteorological radar, and the angular aperture corresponds to a height of a cloud.

11. The method according to claim 5, wherein the value of $\theta_p$ for which the function e vanishes points to a center of a cloud, an altitude of the center of the cloud being calculated by trigonometry, using a predetermined distance between the radar antenna and the cloud.

12. The method according to claim 11, wherein an altitude of a summit of the cloud is calculated by adding half of a height of the cloud to the altitude of the center of the cloud.

13. The method according to claim 10, wherein the meteorological radar is airborne.

* * * * *